United States Patent
Lee et al.

(10) Patent No.: US 10,106,979 B2
(45) Date of Patent: Oct. 23, 2018

(54) SEISMIC REINFORCING DEVICE

(71) Applicant: KOREA ELECTRIC POWER CORPORATION, Naju-si, Jeollanam-do (KR)

(72) Inventors: Kyung Jin Lee, Daejeon (KR); Kyung Won Hahm, Daejeon (KR)

(73) Assignee: KOREA ELECTRIC POWER CORPORATION, Naju-si, Jeollanam-do (KR)

( * ) Notice: Subject to any disclaimer, the term of this patent is extended or adjusted under 35 U.S.C. 154(b) by 0 days.

(21) Appl. No.: 15/335,085

(22) Filed: Oct. 26, 2016

(65) Prior Publication Data

US 2017/0145686 A1 May 25, 2017

(30) Foreign Application Priority Data

Nov. 23, 2015 (KR) .......................... 10-2015-0163801

(51) Int. Cl.
*E04H 9/02* (2006.01)
*E04B 1/98* (2006.01)
*F16F 15/02* (2006.01)

(52) U.S. Cl.
CPC .............. *E04B 1/98* (2013.01); *E04B 1/985* (2013.01); *E04H 9/02* (2013.01); *E04H 9/021* (2013.01); *E04H 9/027* (2013.01); *F16F 15/022* (2013.01); *E04H 2009/026* (2013.01)

(58) Field of Classification Search
CPC . E04B 1/98; E04B 1/985; E04H 9/021; E04H 2009/026; E04H 9/027; E04H 9/02; F16F 15/022

See application file for complete search history.

(56) References Cited

U.S. PATENT DOCUMENTS

| 4,441,289 | A | * | 4/1984 | Ikuo | E04H 9/02 52/167.1 |
| 5,036,633 | A | * | 8/1991 | Kobori | E04H 9/02 52/1 |

(Continued)

FOREIGN PATENT DOCUMENTS

| JP | 58043813 A | * | 3/1983 | ............... F16F 9/38 |
| JP | H2-128035 A | | 5/1990 | |

(Continued)

OTHER PUBLICATIONS

Office Action issued in corresponding Japanese Patent Application No. 2016-210443, dated Dec. 5, 2017, with English Translation.

*Primary Examiner* — Adriana Figueroa
*Assistant Examiner* — Jessie T Fonseca
(74) *Attorney, Agent, or Firm* — McDermott Will & Emery LLP

(57) ABSTRACT

The present invention relates to a seismic reinforcing device capable of conveniently conducting reinforcement of a structure, the device includes an upper support installed on an upper horizontal portion configured to connect columns, a lower support disposed under the upper horizontal portion, installed on a lower horizontal portion configured to connect the columns, and disposed in a diagonal direction with respect to the upper support, and a damper coupled to the upper support and the lower support and configured to absorb a shock.

9 Claims, 4 Drawing Sheets

(56) References Cited

U.S. PATENT DOCUMENTS

| | | | | | |
|---|---|---|---|---|---|
| 5,533,307 | A | * | 7/1996 | Tsai | E04H 9/021 52/167.1 |
| 5,630,298 | A | * | 5/1997 | Tsai | E04H 9/021 52/167.1 |
| 5,845,438 | A | * | 12/1998 | Haskell | E04H 9/02 52/167.1 |
| 6,233,884 | B1 | * | 5/2001 | Tipping | E04H 9/02 52/167.1 |
| 8,505,260 | B1 | * | 8/2013 | Chang | E04H 9/02 52/167.3 |
| 2002/0129568 | A1 | * | 9/2002 | Oka | E04H 9/02 52/167.3 |
| 2003/0042088 | A1 | * | 3/2003 | Braun | E04H 9/02 188/314 |
| 2007/0000078 | A1 | * | 1/2007 | Kim | E01D 19/00 14/78 |
| 2010/0107518 | A1 | * | 5/2010 | Heath | E04H 9/02 52/167.3 |
| 2010/0205876 | A1 | * | 8/2010 | Christopoulus | E04H 9/02 52/167.3 |
| 2010/0319274 | A1 | * | 12/2010 | Tsai | E04H 9/02 52/167.3 |
| 2011/0131894 | A1 | * | 6/2011 | Vreeland | E04H 9/021 52/126.6 |
| 2012/0038091 | A1 | * | 2/2012 | Tagawa | E04H 9/021 267/136 |
| 2012/0167490 | A1 | * | 7/2012 | Balducci | E04H 9/021 52/167.3 |
| 2013/0139452 | A1 | * | 6/2013 | Tsai | E04B 1/98 52/167.3 |
| 2013/0174501 | A1 | * | 7/2013 | Michael | F16F 9/303 52/167.1 |
| 2015/0184413 | A1 | * | 7/2015 | Pryor | E04H 9/021 52/167.3 |
| 2015/0218838 | A1 | * | 8/2015 | Ichikawa | E04H 9/00 52/167.3 |
| 2015/0284971 | A1 | * | 10/2015 | Ichikawa | E04H 9/02 52/167.3 |

FOREIGN PATENT DOCUMENTS

| | | |
|---|---|---|
| JP | H10-140873 A | 5/1998 |
| JP | H10-227148 A | 8/1998 |
| JP | 2003-13614 A | 1/2003 |
| JP | 2003-41798 A | 2/2003 |
| JP | 2004-218288 A | 8/2004 |
| JP | 2010-281171 A | 12/2010 |
| JP | 48-21342 B2 | 11/2011 |
| JP | 2014-214513 A | 11/2014 |
| JP | 2015-152166 A | 8/2015 |
| KR | 10-2008-0021858 A | 3/2008 |
| KR | 10-2009-0090469 A | 8/2009 |
| KR | 10-2011-0121312 A | 11/2011 |
| KR | 10-1202728 B1 | 11/2012 |
| KR | 10-2015-0034387 A | 4/2015 |
| WO | WO 2016068401 A1 * 5/2016 | ............... E04B 1/38 |

* cited by examiner

SEISMIC REINFORCING DEVICE

CROSS-REFERENCE TO RELATED APPLICATION

This application claims priority to and the benefit of Korean Patent Application No. 2015-0163801, filed on Nov. 23, 2015, the disclosure of which is incorporated herein by reference in its entirety.

BACKGROUND

1. Field of the Invention

The present invention relates to a seismic reinforcing device, and more particularly, to a seismic reinforcing device capable of being conveniently installed in an existing structure and improving seismic strength of the existing structure.

2. Discussion of Related Art

Generally, a seismic reinforcing method of a structure is classified into a method which improves strength (a resisting force) of a structure (strength resistance type) and a method which improves deformation capacity of a structure (ductility resistance type).

A feature of the strength resistance type of seismic reinforcing method is that a plane of a structure is mainly reinforced by additionally installing bearing walls, increasing a thickness of an existing wall, installing steel braces, or the like.

The ductility resistance type of seismic reinforcing method is a method of mainly reinforcing individual members such as columns and beams. The ductility resistance type of seismic reinforcing method, steel frame bracings are installed on outer walls of an existing structure. Steel plates are installed either on columns or beams, and bracings are attached to the steel plates to install the bracings.

However, when a bracing is installed at a structure in which a seismic reinforcing member is provided with a steel frame and an electric power structure (an electric substation, a hydroelectric power plant, a thermoelectric power plant, and a nuclear power plant) by being field welded, there are problems in that existing electric or electronic devices and the like that are already installed may be influenced, and it is difficult to ensure and verify the field welding. In addition, an existing seismic reinforcement member has a problem in that thermal deformation and damage occurs on a base metal due to a residual stress generated by the field welding. Accordingly, it is necessary to address the problems.

The prior art of the present invention is disclosed in Korean Laid-open Patent Application No. 2011-0121312 (published on Nov. 7, 2011, title of the invention: The hysteresis damper for the earthquake-proof).

SUMMARY OF THE INVENTION

The present invention is directed to a seismic reinforcing device capable of being conveniently installed at an existing structure and seismically reinforcing the structure.

According to an aspect of the present invention, there is provided a seismic reinforcing device including: an upper support installed on an upper horizontal portion configured to connect columns; one or more lower supports installed on a lower horizontal portion, which is disposed under the upper horizontal portion and connects the columns, and disposed in a diagonal direction with respect to the upper support; and dampers coupled to the upper support and the lower supports and configured to absorb a shock.

The upper support may include side supports respectively installed on both ends of the upper horizontal portion; and a central support installed on the upper horizontal portion and disposed between the side supports, wherein the lower supports may be disposed between the side supports and the central support in a horizontal direction.

The dampers may be disposed between the upper support and the lower supports in a zigzag shape.

The dampers may be disposed between the columns to have a "W" shape.

The upper horizontal portion may include an upper horizontal bar configured to connect the columns and an upper slab configured to cover the upper horizontal bar, and the upper support may include: an upper steel plate disposed on a bottom surface of the upper horizontal bar; an upper protruding plate extending downward from the upper steel plate; an upper damper fixing portion configured to fix the damper to the upper protruding plate by adjusting a rotation angle of the damper; and an upper steel plate fixing portion configured to fix the upper steel plate to the upper horizontal bar.

The upper steel plate fixing portion may include one or more upper fixing heads seated on the upper slab; an upper fixing penetrator configured to extend from the upper fixing head, configured to pass through the upper slab and the upper steel plate, and disposed on an outside of the upper horizontal bar; and an upper fixing coupler screw-coupled to the upper fixing penetrator and configured to press the upper steel plate.

The lower horizontal portion may include: a lower horizontal bar configured to connect the columns and a lower slab configured to cover the lower horizontal bar; and the lower support may include: a lower steel plate disposed on a top surface of the lower slab; a lower protruding plate configured to extend upward from the lower steel plate; and a lower damper fixing portion configured to fix the damper to the lower protruding plate by adjusting a rotation angle of the damper.

The lower support may further include a lower steel plate fixing portion configured to fix the lower steel plate to the lower horizontal bar.

The damper may include: a damper upper coupler coupled to the upper support; a damper lower coupler coupled to the lower support; a damper hydraulic portion configured to connect the damper upper coupler and the damper lower coupler and having a length adjusted by hydraulic pressure; and a damper elastic portion configured to elastically support the damper upper coupler and the damper lower coupler.

The damper may further include a corrugated damper cover configured to connect the damper upper coupler and the damper lower coupler, configured to cover the damper elastic portion, and having a corrugated shape such that a length thereof varies.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a seismic reinforcing device according to embodiments of the present invention will be described in detail with reference to the accompanying drawings. Thicknesses of lines or sizes of components illustrated in the accompanying drawings may be exaggerated and illustrated for the sake of convenience and clearness in the description. In addition, some terms described below are defined in consideration of functions thereof in the invention, and meanings may vary depending on, for example, a user or operator's intentions or customs. Therefore, the meanings of terms should be interpreted based on the scope throughout this specification.

Figure 1:
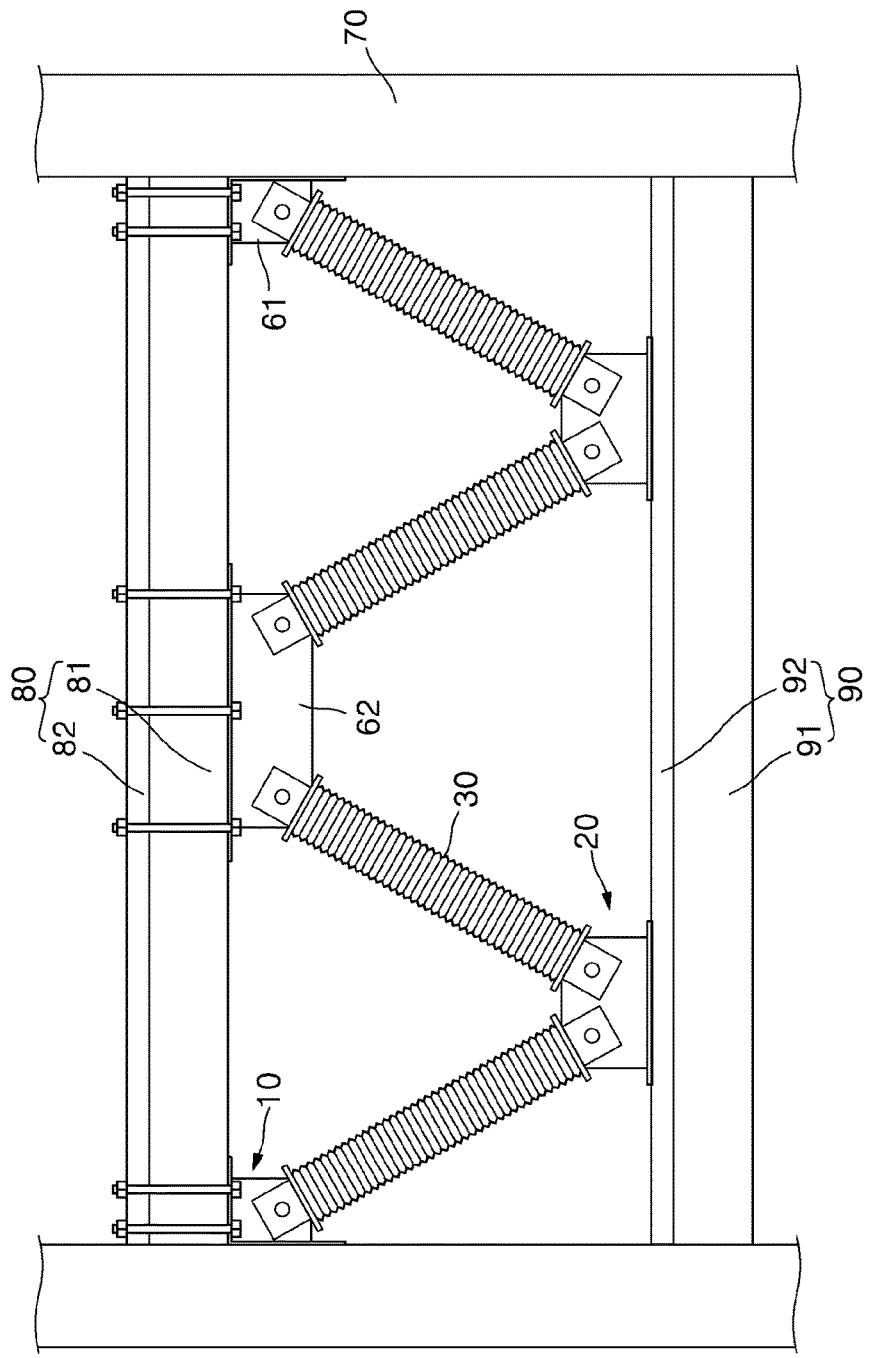
FIG. 1 is a schematic view illustrating a seismic reinforcing device according to one embodiment of the present invention.

FIG. 1 is a schematic view illustrating a seismic reinforcing device according to one embodiment of the present invention. Referring to FIG. 1, a seismic reinforcing device 1 according to one embodiment of the present invention includes an upper support 10, lower supports 20, and dampers 30. The seismic reinforcing device 1 is installed at an existing structure.

Meanwhile, components forming a framework of the structure include a plurality of columns 70, upper horizontal portions 80 configured to connect the columns 70, and lower horizontal portions 90 disposed under the upper horizontal portions 80. Each of the upper horizontal portions 80 may include an upper horizontal bar 81 disposed between the columns 70 and having both ends connected to the columns 70, and an upper slab 82 configured to cover the upper horizontal bar 81. Each of the lower horizontal portions 90 may include a lower horizontal bar 91 disposed between the columns 70 and having both ends connected to the columns 70, and a lower slab 92 configured to cover the lower horizontal bar 91. Conventionally, a ceiling portion of each floor of the structure may correspond to the upper horizontal portion 80 and a floor thereof may correspond to the lower horizontal portion 90.

The upper support 10 is installed on the upper horizontal portion 80, and the lower supports 20 are installed on the lower horizontal portion 90. Here, one or more upper supports 10 are disposed in a longitudinal direction of the upper horizontal portion 80, and one or more lower supports 20 are disposed in a longitudinal direction of the lower horizontal portion 90. The upper support 10 and the lower supports 20 are disposed in a diagonal direction (see FIG. 1).

The damper 30 is coupled to the upper support 10 and the lower support 20 and absorbs a shock. For example, an upper end of the damper 30 may be coupled to the upper support 10, and a lower end of the damper 30 may be coupled to the lower support 20.

The upper support 10 is divided into side supports 61 respectively installed at both ends of the upper horizontal portion 80 and a central support 62 installed on the upper horizontal portion 80 and disposed between the side supports 61. For example, the side supports 61 may be respectively disposed adjacent to the pair of columns 70, and the central support 62 may be disposed at a central portion of the upper horizontal portion 80.

The lower supports 20 are disposed between the side supports 61 and the central support 62. That is, one side support 61, one lower support 20, the central support 62, the other lower support 20, and the other side support 61 may be sequentially disposed between one column 70 and the other column 70 spaced apart from the one column 70 in a right direction. One damper 30 may be installed at the side support 61, and two dampers 30 may be installed at the central support 62 and the lower support 20. Accordingly, when four obliquely disposed dampers 30 are connected by a virtual line, the four dampers 30 have a zigzag or "W" shape.

Accordingly, even which a seismic force having a horizontal seismic acceleration acts on a structure, the force acts in an axial direction of each of the dampers 30 and the structure endures such a seismic load.

Figure 2:
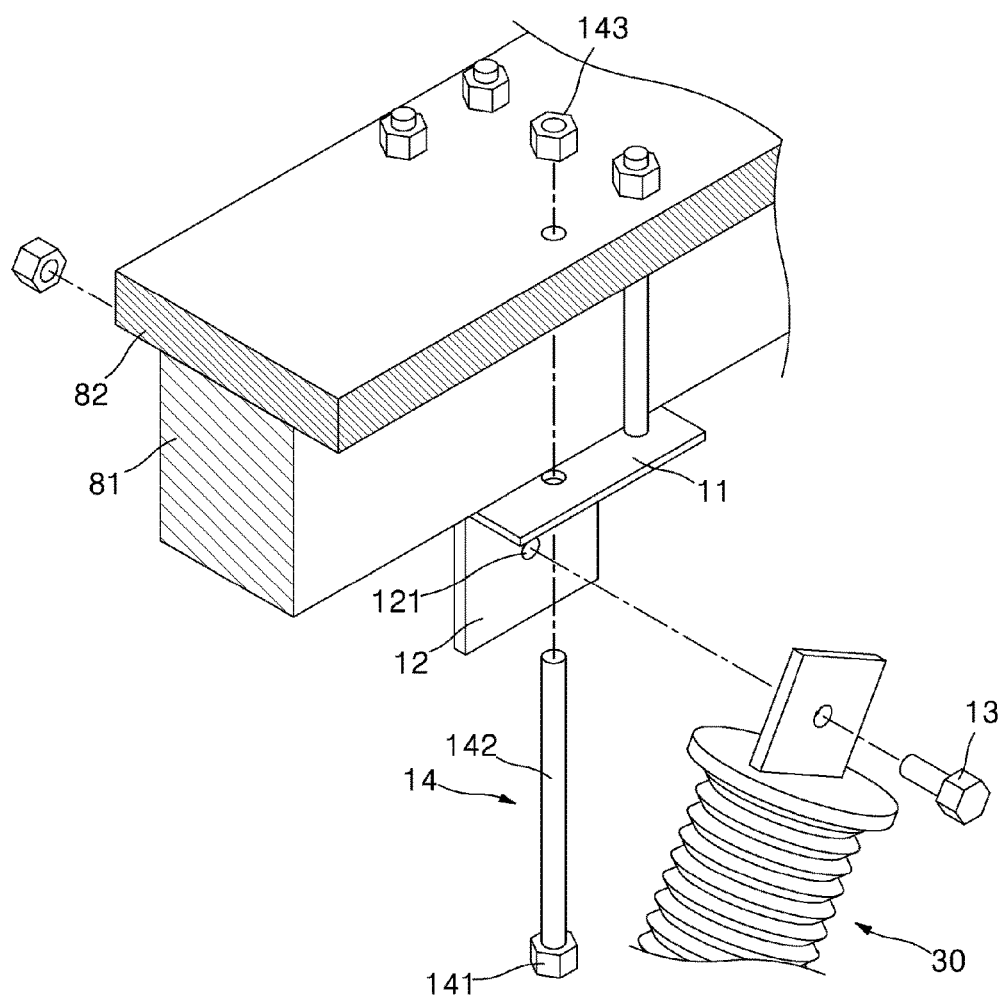
FIG. 2 is a schematic view illustrating an upper support of the seismic reinforcing device according to one embodiment of the present invention.

FIG. 2 is a schematic view illustrating an upper support of the seismic reinforcing device according to one embodiment of the present invention. Referring to FIGS. 1 and 2, the upper support 10 according to one embodiment of the present invention includes an upper steel plate 11, an upper protruding plate 12, upper damper fixing portions 13, and upper steel plate fixing portions 14.

The upper steel plate 11 is disposed on a bottom surface of the upper horizontal bar 81. For example, the upper steel plate 11 may have a shape of a square plate and may be formed to have a width greater than that of the upper horizontal bar 81.

The upper protruding plate 12 extends downward from the upper steel plate 11. Upper protrusion holes 121 may be formed in the upper protruding plate 12 for coupling with the dampers 30. For example, one upper protrusion hole 121 may be formed in the side support 61 for coupling with one damper 30, and two upper protrusion holes 121 may be formed in the central support 62 for coupling with two dampers 30.

The upper damper fixing portion 13 fixes the damper 30 to the upper protruding plate 12 by adjusting a rotation angle of the damper 30. For example, the upper damper fixing portion 13 may be formed with a bolt and a nut, may pass through the damper 30, and may pass through the upper protrusion hole 121. Accordingly, the rotation angle of the damper 30 may be adjusted after a clamping force of the upper damper fixing portion 13 is relaxed, and when the angle adjusting of the damper 30 is completed, a state in which the damper 30 is installed may be maintained by reinforcing the clamping force of the upper damper fixing portion 13.

Each of the upper steel plate fixing portions 14 fixes the upper steel plate 11 to the upper horizontal bar 81. For example, four or six upper steel plate fixing portions 14 may be coupled to the upper steel plate 11 in a state of being installed at the upper slab 82.

The upper steel plate fixing portion 14 includes an upper fixing head 141, an upper fixing penetrator 142, and an upper fixing coupler 143. The upper fixing head 141 supports a bottom surface of the upper steel plate 11. The upper fixing penetrator 142 extends from the upper fixing head 141 and passes through the upper slab 82 and the upper steel plate 11. The upper fixing penetrator 142 is disposed on the outside of the upper horizontal bar 81. The upper fixing coupler 143 is screw-coupled to an end of the upper fixing penetrator 142 and seated on the upper slab 82. For example, a pair of upper fixing penetrators 142 may be disposed on each of one and the other side surfaces of the upper horizontal bar 81 to be spaced apart from each other and may pass through a corner portion of the upper steel plate 11.

Figure 3:
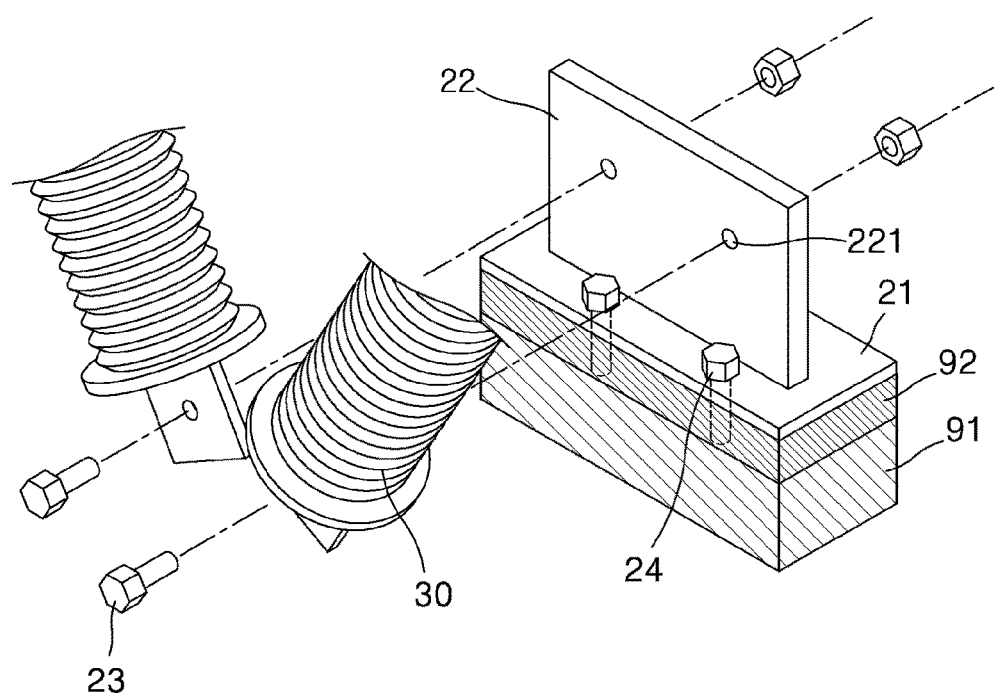
FIG. 3 is a schematic view illustrating a lower support of the seismic reinforcing device according to one embodiment of the present invention.

FIG. 3 is a schematic view illustrating a lower support of the seismic reinforcing device according to one embodiment of the present invention. Referring to FIGS. 1 and 3, the lower support 20 according to one embodiment of the present invention includes a lower steel plate 21, a lower protruding plate 22, and lower damper fixing portions 23.

The lower steel plate 21 is disposed on a top surface of the lower slab 92. For example, the lower steel plate 21 may have a shape of a square plate and may be seated on the lower slab 92 which covers the lower horizontal bar 91.

The lower protruding plate 22 extends upward from the lower steel plate 21. Lower protrusion holes 221 may be formed in the lower protruding plate 22 to be coupled with the dampers 30. For example, two lower protrusion holes 221 may be formed in the lower protruding plate 22 to be coupled with two dampers 30.

Each of the lower damper fixing portion 23 fixes the damper 30 to the lower protruding plate 22 by adjusting the rotation angle of the damper 30. For example, the lower damper fixing portion 23 may be formed with a bolt and a nut, may pass through the damper 30, and may pass through the lower protruding hole 221. Accordingly, the rotation angle of the damper 30 may be adjusted after a clamping force of the lower damper fixing portion 23 is relaxed, and when the angle adjusting of the damper 30 is completed, a state in which the damper 30 is installed may be maintained by reinforcing the clamping force of the lower damper fixing portion 23.

The lower support 20 according to one embodiment of the present invention may further include lower steel plate fixing portions 24. Each of the lower steel plate fixing portions 24 fixes the lower steel plate 21 to the lower horizontal bar 91. For example, the lower steel plate fixing portion 24 may be a bolt which passes through the lower slab 92 and may be inserted into the lower horizontal bar 91, and may be various other fixing units for fixing objects. The lower steel plate fixing portion 24 may be installed at the lower horizontal portion 90 of every floor, and particularly, may fix the lower steel plate 21 by being effectively used as a first or basement floor which has no lower floors. When the lower steel plate 21 is fixed to the lower horizontal bar 91 as described above, strength of a structure may be increased against vertical directional force of an earthquake.

Figure 4:
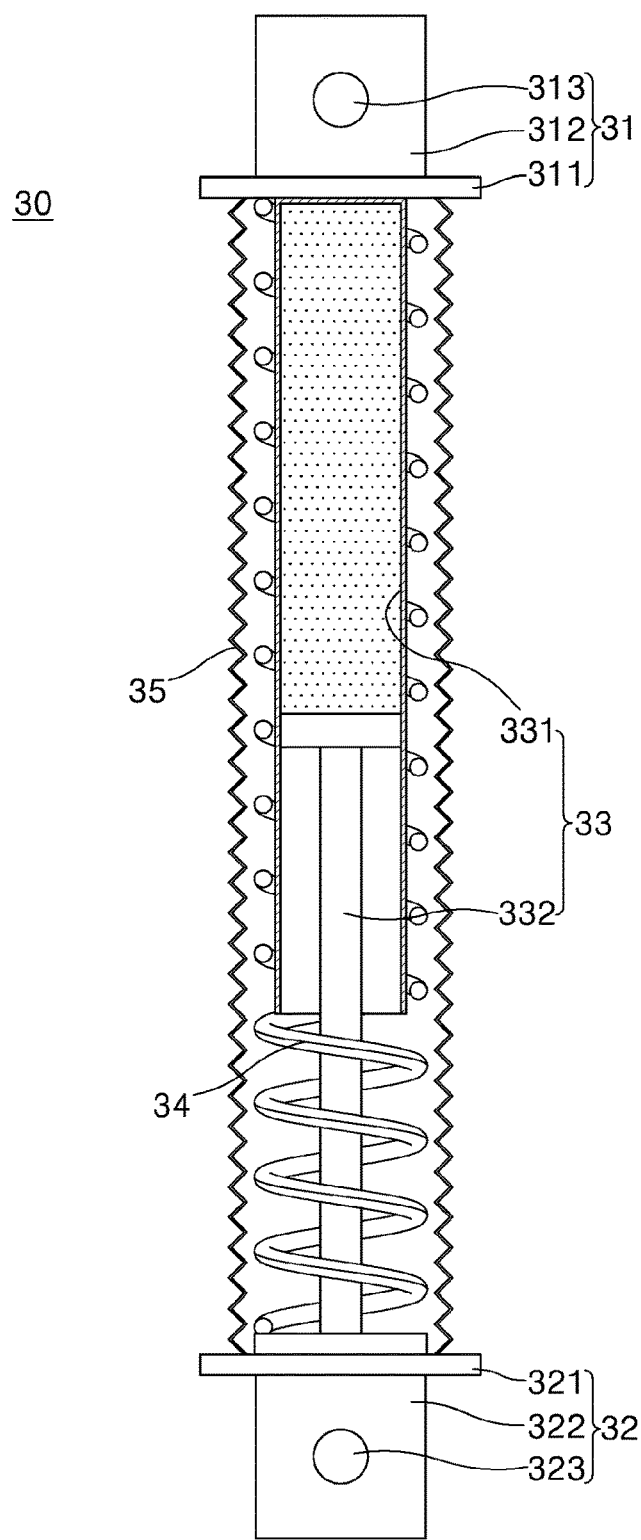
FIG. 4 is a schematic view illustrating a damper of the seismic reinforcing device according to one embodiment of the present invention.

FIG. 4 is a schematic view illustrating a damper of the seismic reinforcing device according to one embodiment of the present invention. Referring to FIGS. 1 to 4, the damper 30 according to one embodiment of the present invention includes a damper upper coupler 31, a damper lower coupler 32, a damper hydraulic portion 33, and a damper elastic portion 34.

The damper upper coupler 31 is coupled to the upper support 10. For example, the damper upper coupler 31 may include an upper coupling plate 311, an upper coupling protrusion 312, and an upper coupling hole 313. The upper coupling protrusion 312 may protrude from the upper coupling plate 311, may have a shape of a plate, may overlap the upper protruding plate 12, and may be fixed by the upper damper fixing portion 13 through the upper coupling hole 313 formed to correspond to the upper protrusion hole 121.

The damper lower coupler 32 is coupled to the lower support 20. For example, the damper lower coupler 32 may include a lower coupling plate 321, a lower coupling protrusion 322, and a lower coupling hole 323. The lower coupling protrusion 322 may protrude from the lower coupling plate 321, may have a shape of a plate, may overlap the lower protruding plate 22, and may be fixed by the lower damper fixing portion 23 through the lower coupling hole 323 formed to correspond to the lower protruding hole 221.

A damper hydraulic portion 33 connects the damper upper coupler 31 and the damper lower coupler 32, and a length thereof is adjusted by hydraulic pressure. For example, the damper hydraulic portion 33 may include a cylinder 331 coupled to the upper coupling plate 311 and a piston 332 coupled to the lower coupling plate 321. One side of the cylinder 331 may be open and oil may be stored therein, and the piston 332 may be inserted through an open portion of the cylinder 331.

One end of the damper elastic portion 34 is coupled to the damper upper coupler 31, the other end is coupled to the damper lower coupler 32, and the damper elastic portion 34 elastically supports the damper upper coupler 31 and the damper lower coupler 32. For example, the damper elastic portion 34 may have a shape of a coil spring which surrounds the damper hydraulic portion 33. The one end of the damper elastic portion 34 may be coupled to the upper coupling plate 311, and the other end may be coupled to the lower coupling plate 321.

The damper 30 according to one embodiment of the present invention may further include a corrugated damper cover 35. The corrugated damper cover 35 connects the damper upper coupler 31 and the damper lower coupler 32, covers the damper hydraulic portion 33 and the damper elastic portion 34, and has a corrugated shape such that a length thereof varies. The corrugated damper cover 35 may protect the damper hydraulic portion 33 and the damper elastic portion 34.

An installation process of the seismic reinforcing device having the above structure according to one embodiment of the present invention will be described below.

The upper support 10 is disposed on the upper horizontal portion 80 positioned between the columns 70, and the lower support 20 is disposed on the lower horizontal portion 90 disposed below the upper horizontal portion 80.

Here, three upper supports 10 are installed at the central portion of the upper horizontal portion 80 and both of the ends of the upper horizontal portion 80, respectively. Although the upper support 10 is fixedly installed on the upper slab 82 which covers an upper portion of the upper horizontal bar 81, the upper support 10 is not inserted into the upper horizontal bar 81, and thus cracking of the upper horizontal bar 81 is prevented and an installation process is facilitated.

The lower supports 20 are positioned between the three upper supports 10, and the upper support 10 and the lower supports 20 are diagonally disposed. Accordingly, four dampers 30 whose upper and lower ends are respectively coupled to the upper supports 10 and the lower support 20 are obliquely disposed and have a "W" shape.

Meanwhile, in a case of a basement or first floor which has no lower floors, the lower supports 20 are fixedly installed at the lower horizontal bar 91 by the lower steel plate fixing portions 24.

When a seismic force is transferred to a structure in a state in which the seismic reinforcing device 1 is installed at the structure, a load is transferred in the axial direction of each damper 30, and the dampers 30 relieve the load. That is, when a seismic force is transferred to the dampers 30 by a horizontal seismic force, the damper hydraulic portions 33 and the damper elastic portions 34 relieve the seismic force.

The seismic reinforcing device 1 according to one embodiment of the present invention can relieve a seismic force because the upper support 10 is installed on the upper horizontal portion 80, the lower supports 20 are installed on the lower horizontal portion 90, and the dampers 30 are disposed in a "W" shape and coupled to the upper support 10 and the lower supports 20.

In the seismic reinforcing device 1 according to one embodiment of the present invention, processability can be improved because the upper support 10 is fixed to the upper slab 82 without passing through the upper horizontal bar 81.

In the seismic reinforcing device 1 according to one embodiment of the present invention, a seismic force can be offset by the dampers 30 due to a hydraulic pressure of the damper hydraulic portions 33 and a spring force of the damper elastic portions 34.

While the invention has been described with reference to the embodiments illustrated in the accompanying drawings, the embodiments should be considered in a descriptive sense only, and it should be understood that various alterations and equivalent other embodiments may be made by those skilled in the art. Therefore, the scope of the invention is defined by the appended claims.

What is claimed is:

1. A seismic reinforcing device comprising:
   an upper support installed on an upper horizontal portion configured to connect columns;
   lower supports installed on a lower horizontal portion, which is disposed under the upper horizontal portion and connects the columns, and disposed in a diagonal direction with respect to the upper support, disposed at a non-zero distance from each of the columns;
   dampers coupled to the upper support and one of the lower supports and configured to absorb a shock; and
   corrugated damper covers,
   wherein each of the dampers includes:
      a damper upper coupler coupled to the upper support;
      a damper lower coupler coupled to one of the lower supports;
      a damper hydraulic portion configured to connect the damper upper coupler and the damper lower coupler and having a length adjusted by hydraulic pressure; and
      a damper elastic portion configured to elastically support the damper upper coupler and the damper lower coupler, and the damper elastic portion surrounds the damper hydraulic portion,
      the damper elastic portion and the damper hydraulic portion are enclosed by and spaced-apart from one of the corrugated damper covers.

2. The seismic reinforcing device of claim 1, wherein the upper support includes:
   side supports respectively installed on both ends of the upper horizontal portion; and
   a central support installed on the upper horizontal portion and disposed between the side supports,
   wherein the lower supports are disposed between the side supports and the central support in a horizontal direction.

3. The seismic reinforcing device of claim 2, wherein the dampers are disposed between the upper support and the lower supports in a zigzag shape.

4. The seismic reinforcing device of claim 3, wherein the dampers are disposed between the columns to have a "W" shape.

5. The seismic reinforcing device of claim 1, wherein:
   the upper horizontal portion includes an upper horizontal bar configured to connect the columns and an upper slab configured to cover the upper horizontal bar; and
   the upper support includes:
   an upper steel plate disposed on a bottom surface of the upper horizontal bar;
   an upper protruding plate extending downward from the upper steel plate;
   an upper damper fixing portion configured to fix the damper to the upper protruding plate by adjusting a rotation angle of the damper; and
   an upper steel plate fixing portion configured to, fix the upper steel plate to the upper horizontal bar.

6. The seismic reinforcing device of claim 5, wherein the upper steel plate fixing portion includes:
   one or more upper fixing heads seated on the upper slab;
   an upper fixing penetrator configured to extend from the upper fixing head, configured to pass through the upper slab and the upper steel plate, and disposed on an outside of the upper horizontal bar; and
   an upper fixing coupler screw-coupled to the upper fixing penetrator and configured to press the upper steel plate.

7. The seismic reinforcing device of claim 1, wherein:
   the lower horizontal portion includes a lower horizontal bar configured to connect the columns and a lower slab configured to cover the lower horizontal bar; and
   each lower support including:
   a lower steel plate disposed on a top surface of the lower slab;
   a lower protruding plate configured to extend upward from the lower steel plate; and
   a lower damper fixing portion configured to fix one of the dampers to the lower protruding plate by adjusting a rotation angle of said one of the dampers.

8. The seismic reinforcing device of claim 7, wherein each lower support further includes a lower steel plate fixing portion configured to fix the lower steel plate to the lower horizontal bar.

9. The seismic reinforcing device of claim 1, wherein each corrugated damper cover configured to connect the damper upper coupler and the damper lower coupler, configured to cover the damper elastic portion, and having a corrugated shape such that a length thereof varies.

* * * * *